Dec. 4, 1956 S. E. REYNOLDS 2,772,889
WHEELED SUPPORT FOR CONTAINERS
Filed March 10, 1955
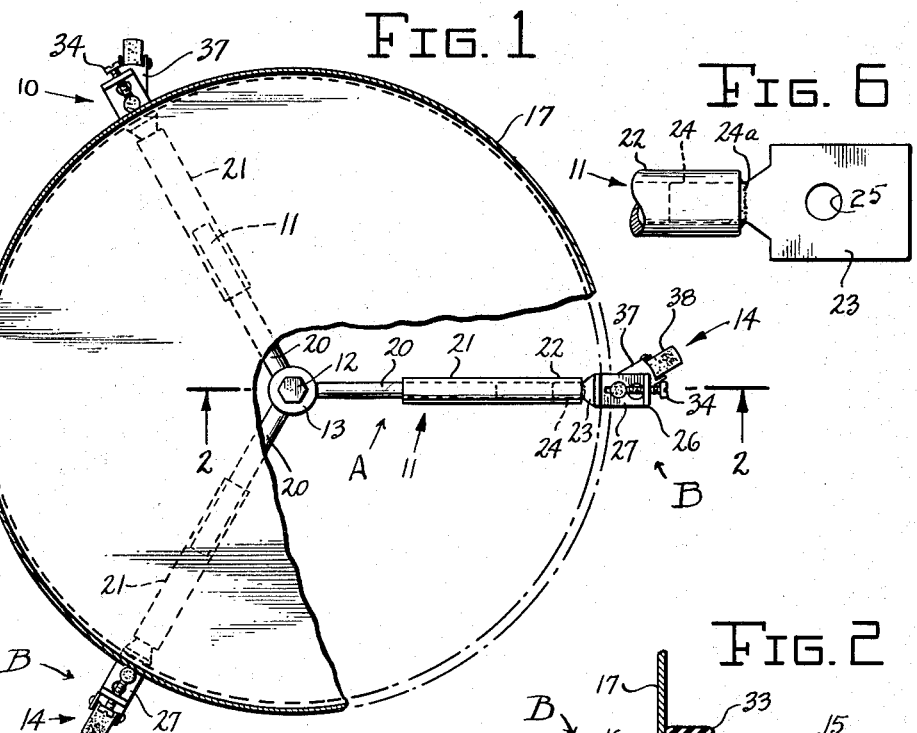
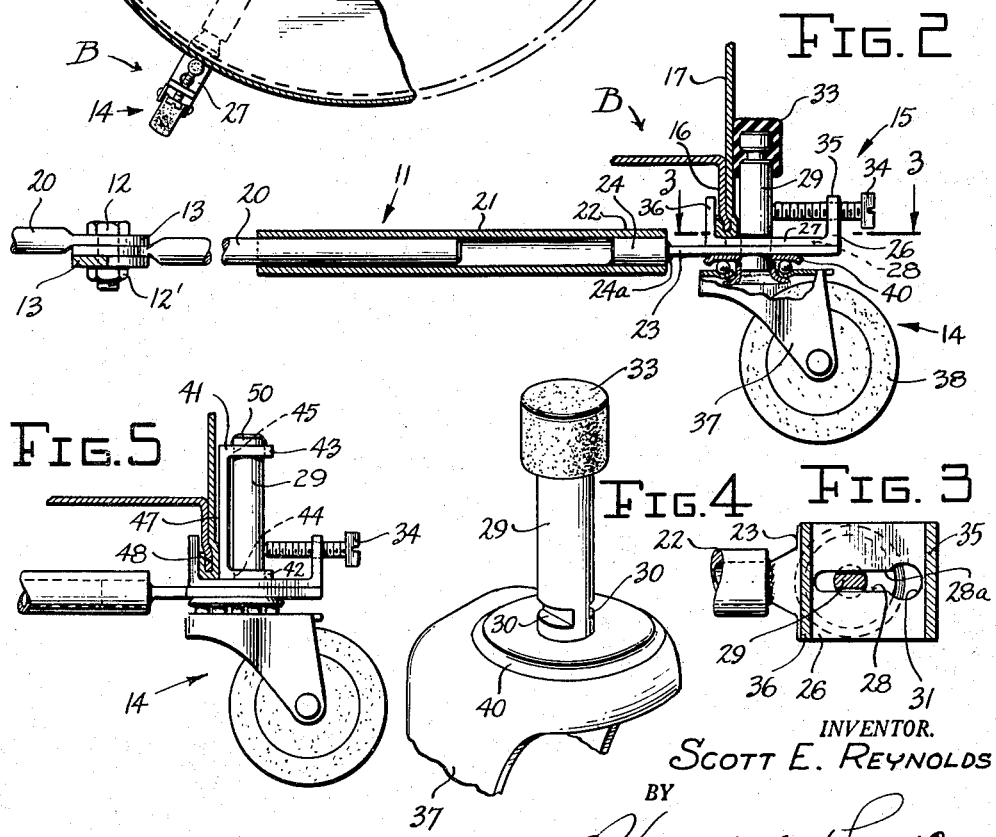
INVENTOR.
SCOTT E. REYNOLDS
BY
Hansen and Lane
ATTORNEYS.

United States Patent Office 2,772,889
Patented Dec. 4, 1956

2,772,889

WHEELED SUPPORT FOR CONTAINERS

Scott E. Reynolds, Sunnyvale, Calif.

Application March 10, 1955, Serial No. 493,345

5 Claims. (Cl. 280—35)

This invention relates to supports, and pertains more particularly to a wheeled support for attachment to the base of flanged containers such as garbage cans.

An object of the present invention is to provide a wheeled support for a heavy, bulky container having a bottom flange thereon.

Another object of the invention is to provide an improved wheeled carrier of the character described which may be easily adjusted to adapt it to various sizes of containers.

Still another object is to provide a wheeled carrier with improved clamping means adapted to grip a downwardly projecting flange on the bottom of the container, thereby to secure the carrier to the container.

These and other objects and advantages of the invention will be apparent from the following description and the accompanying drawing, wherein:

Fig. 1 is a horizontal sectional view looking downwardly toward the base of a garbage container having a wheeled carrier embodying this invention clamped thereon, a portion of the container being broken away.

Fig. 2 is an enlarged sectional view taken along the line 2—2 of Fig. 1.

Fig. 3 is a similarly enlarged sectional view taken along the line 3—3 of Fig. 2.

Fig. 4 is a further enlarged fragmentary perspective view showing the upper portion of a caster, the pintle of which is modified for use with this invention.

Fig 5 is a fragmentary view similar to that shown in Fig. 2 but showing a slightly modified form of clamp construction.

Fig. 6 is a plan view of the outer end of one of the radial arms before applying the channel clamp member thereto.

A preferred form A of the present invention, shown in Figs. 1 to 4 inclusive, has a support frame 10 for positioning three caster and clamp assemblies B at spaced points about the bottom flange of a container to be supported thereon. The frame 10 comprises three telescoping type radial arms 11 secured together at their inner ends 13 by a common, centrally located hub bolt 12 and nut 12'. Each arm 11 has a swiveling type caster 14 mounted on its outer end. In addition thereto a clamping means 15 is provided at the outer end of each arm 11 for the purpose of clamping the support 10 to the downwardly projecting marginal bottom flange 16 of a container 17 as shown in Figs 1 and 2.

Referring in greater detail to the construction of the individual component parts of the wheeled support A, each of the arms 11 (Fig. 2) consists of an inner, rod-like portion 20, telescopically inserted within an outer sleeve portion 21 to permit adjustment of the length of the arms 11. The inner rod portions 20 are freely slidable within the outer sleeve portions 21, and are flattened and drilled at their inner ends 13 to receive the hub bolt 12, by which, and its co-acting nut 12', they are pinned together.

A horizontally disposed end plate 23 is mounted on the outer end 22 of each sleeve portion 21, and is provided with a stud portion 24 which is fitted into the outer end of the sleeve portion 21 (Figs. 2 and 6) Each stud portion 24 may be permanently secured to its associated sleeve portion 21 as by brazing 24a. A hole 25 is provided in each plate portion 23 to receive a caster pintle 29 closely therein.

Upon each end plate 23 is slidably mounted a channel clamp member 26, with its troughed side upward and disposed transversely to the length of the radial arm 11 upon which it is mounted. The length of each channel member 26 is approximately equal to the width of the end plate 23 upon which it is mounted.

The base web 27 of each channel member 26 has therein a keyhole-shaped slot 28 (Fig. 3) for the reception of a double notched portion 30 of the pintle 29 of its associated caster 14, which pintle projects upwardly through the hole 25 in the end plate 23, and through the slot 28. The double notched portion 30 of each caster pintle 29 is of a width to fit slidably closely within the narrow portion 28a of the keyhole-shaped slot 28, to retain the pintle from rotation or axial withdrawal from the slot, while the enlarged end portions 31 of the keyhole-shaped slots 28 permits the insertion or withdrawal of the full diameter of the un-notched portion of the pintle 29 when centered therein.

The notched portion 30 of each caster pintle is at a height on the pintle to hold the channel clamp member 26 in close slidable engagement with its supporting end plate 23.

After each caster 14 is mounted with its respective pintle 29 inserted upwardly in the hole 25 in its end plate 23, and the round portion 31 of a keyhole slot 28 has been fitted over the pintle, and the channel member 26 has been moved laterally to move the double notched portion 30 into the narrower portion 28a of the slot 28, a rubber cap 33 may be fitted onto the upper end of each caster pintle 29.

In order to provide a means for clamping the support 10 onto a container such as the garbage can 17 having a bottom flange 16 thereon, a clamping screw 34 is screwed into a threaded opening provided therefor in the outer flange 35 of each channel member 26 to bear endwise against a side of the caster pintle 29 mounted in the keyhole slot 28 in the channel member.

In using the support A, a can 17 is mounted thereon with its bottom flange 16 supported on the bottom webs 27 of the channel members 26, and radially inwardly of the caster pintles 29. By screwing inwardly the screws 34 in the outer flanges 35' of the channel members 26, the channel members are drawn slidably outwardly, urging the inner channel flanges 36 toward the pintles 29 to grip the container flange 16 therebetween.

During this tightening of the clamping screws 34, the rubber caps 33 are forced tightly against the outside of the container above the flange 16, thereby assisting in securing the container 17 to the support A.

Except for the notches 30 on the pintles 29, the casters 14 are of conventional construction and consist of a freely swiveling fork 37 with a usual support wheel 38 journaled therein. The pintle 29 and its associated upper ball bearing race 40 thus may be held against rotation with respect to the frame 10, while still permitting free relative swiveling movement of the fork portion 37 and its support wheel 38 mounted therein.

A slightly modified form of the invention is shown in Fig. 5, wherein a channel grip member 41 is used on the pintle 29 instead of the rubber grip cap 33 of Figs. 2 and 4. All other parts of the assembly shown in Fig. 5 are identical to those shown in Figs. 1 to 4 inclusive, and will, therefore, be designated by the same reference numerals.

The two flanges 42 and 43 of the channel grip member 41 are drilled with co-axial holes 44 and 45, respectively, to receive the pintle 29 of a caster 14. The channel grip members 41 may be turned on their respective pintles 29 to present their flat metallic inner surfaces 47 to the outside of the garbage container's support flange 48 as shown. The top end of each pintle 29 may be riveted as at 50 to prevent the channel 41 from sliding upwardly off the pintle.

While I have illustrated and described a preferred embodiment of my invention, as well as a modification thereof, it will be understood however that other changes and modifications thereof may be made in the details thereof without departing from the scope of my invention as set forth in the appended claims.

Having thus described the invention, what I claim as new and desire to protect by Letters Patent is defined in the following claims.

I claim:

1. A wheeled support for a can-type container having a downwardly extending bottom flange thereon, comprising a plurality of radially extending arms, means pivotally connecting the inner ends of said arms to each other, a caster mounted on the outer end of each arm, each caster comprising a pintle mounted on the arm and extending upwardly therefrom, a caster support wheel swiveled to each pintle, a clamp member mounted on the outer end of each arm and slidable relative to the caster pintle thereon, each clamp member having an upwardly extending jaw portion spaced from its respective pintle to receive the container bottom flange between the flange and the pintle; and screw means acting between each pintle and its clamp member to move the jaw portion relative to the pintle to grip the container bottom flange therebetween.

2. A wheeled support for a can-type container having a downwardly extending bottom flange thereon, comprising a plurality of axially extensible radially extending arms, each arm comprising a sleeve portion and a rod portion telescopically inserted for axial slidable movement in a sleeve portion, means pivotally connecting the inner ends of said arms to each other, a caster mounted on the outer end of each arm, each caster comprising a pintle mounted on the arm and extending upwardly therefrom, a caster support wheel swiveled to each pintle, a clamp member mounted on the outer end of each arm and movable relative to the caster pintle thereon, each clamp member having an upwardly extending jaw portion spaced from its respective pintle to receive the container bottom flange between the flange and the pintle, and screw means acting between each pintle and its clamp member to move the jaw portion relative to the pintle to grip the container bottom flange therebetween.

3. A wheeled support for a can-type container having a downwardly extending bottom flange thereon, comprising a plurality of radially extending arms, a pivot member pivotally connecting the inner ends of said arms to each other, a flat end plate having a longitudinal slot therein mounted on the outer end of each arm, a channel member secured to the upper side of each end plate with its trough upward and extending transversely to the length of the arm on which it is mounted, each channel member having a keyhole slot therein overlying the slot in the end plate on which the channel is mounted, a caster mounted on the outer end of each arm, each caster comprising a pintle inserted in the larger portion of the keyhole slot in a channel member and extending upwardly therefrom, each pintle having a notched portion fitted slidably closely within the narrow portion of the keyhole slot in which it is inserted, one flange of each channel member being spaced from its respective pintle to receive the container bottom flange between said one channel flange and the pintle; and a screw threadedly inserted in a threaded hole in the other flange of each clamp member and engaging each pintle to move the pintle toward each one channel flange to grip a container bottom flange inserted therebetween.

4. A wheeled support for a can-type container having a downwardly extending bottom flange thereon, comprising a plurality of radially extending arms, each arm comprising a rod portion telescopically inserted for axial slidable movement in a sleeve portion, a pivot member pivotally connecting the inner ends of said arms to each other, an upwardly open channel member mounted on the outer end of each arm with the trough of the channel extending transversely to the length of the arm; a caster comprising a pintle portion and a relatively swiveled support wheel portion mounted on the outer end of each arm with the pintle extending upwardly between the inner and outer flanges of the channel member and spaced from one of the channel flanges to receive the container bottom flange between said one flange and the pintle, a screw threadedly engaging the other flange of the channel and in abutting engagement with the caster pintle to urge the caster pintle toward said one channel flange to grip the container bottom flange inserted between the pintle and said one channel flange.

5. A wheeled support for a can-type container having a downwardly extending bottom flange thereon, comprising a frame, a caster assembly mounted at each of three spaced positions on said frame to define a circle having the diameter of a can to be supported thereon, each caster assembly comprising an upwardly open channel clamp member slidably mounted on the frame to receive the bottom flange of a container therein, a clamp screw threadedly inserted in a threaded hole in one flange of each channel member, a caster pintle in each caster assembly mounted between the clamp screw and the other flange of the channel member to receive a container bottom flange between said other flange and the caster pintle, the pintle being in the line of axial movement of the clamp screw, whereby the bottom flange of a container inserted in the channel flanges will be gripped between each pintle and its other channel flange upon tightening the clamp screws to slidably move the clamp members to draw said other flanges toward their respective caster pintles.

References Cited in the file of this patent

UNITED STATES PATENTS

| | | |
|---|---|---|
| 1,322,719 | Nelson | Nov. 25, 1919 |
| 2,137,560 | Anderson | Nov. 22, 1938 |